United States Patent [19]
Hamby et al.

[11] Patent Number: 6,024,198
[45] Date of Patent: Feb. 15, 2000

[54] DUAL CLUTCH REVERSER ACTUATING MECHANISM

[75] Inventors: Glenn Markham Hamby; Robert Allen Folk, both of Coffeyville, Kans.

[73] Assignee: Deere & Company, Moline, Ill.

[21] Appl. No.: 09/069,650

[22] Filed: Apr. 29, 1998

[51] Int. Cl.$^7$ .............................. F16D 13/56; F16D 21/00; F16D 23/12
[52] U.S. Cl. .......................... 192/51; 74/361; 192/89.21; 192/89.26; 192/96
[58] Field of Search .......................... 192/51, 48.9, 70.23, 192/93 R, 96, 89.21, 89.26; 74/361

[56] References Cited

U.S. PATENT DOCUMENTS

| | | | |
|---|---|---|---|
| 1,371,251 | 3/1921 | Larson | 192/93 R X |
| 1,703,788 | 2/1929 | Skinner | 192/93 R X |
| 2,319,366 | 5/1943 | Rippingille | 192/93 R X |
| 2,439,941 | 4/1948 | Lounsbury | 192/89.21 X |
| 2,718,792 | 9/1955 | Kiekhaefer | 192/93 R X |
| 2,737,273 | 3/1956 | Pepper | 192/93 R X |
| 3,481,438 | 12/1969 | Warrick et al. | 192/93 R X |
| 4,371,062 | 2/1983 | Ohkubo | 192/93 R X |
| 4,945,780 | 8/1990 | Bosma | 192/89.21 X |

OTHER PUBLICATIONS

Funk Manufacturing, "Typical Models—4050A010A0, 4050A020A0, 4050A021A0, 4050A050A0", 4 pages (no publication date).

*Primary Examiner*—Rodney H. Bonck

[57] ABSTRACT

A dual clutch forward/reverse unit includes a pair of spring engaged clutch units and a pair of lifter pins, each pin operable to disengage a corresponding one of the clutches. An actuator mechanism for the forward/reverse unit includes a housing, a shaft rotatably mounted in the housing, and a hollow cylindrical sleeve rotatably mounted on the shaft. The shaft and the sleeve are operatively coupled to the lifter pins. The shaft has a pair of cam surfaces formed on an outer periphery thereof. The sleeve has a pair of openings through which the cam surfaces are exposed. A pair of lifters are pivotally supported in the housing. Each lifter has one side engaging a corresponding one of the lifter pins, and has another part engagable with one of the cam surfaces through a corresponding one of the openings. Each cam surface is thus operatively coupled to one of the lifter pins by a lifter. The sleeve is rotatable to a position wherein a wall of the sleeve acts to uncouple the lifters from the shaft so that the shaft can be rotated while both clutches are disengaged. The shaft is then rotatable to selectively engage one or the other of the clutches.

14 Claims, 8 Drawing Sheets

DUAL CLUTCH REVERSER ACTUATING MECHANISM

BACKGROUND OF THE INVENTION

The invention relates to a forward/reverse shifting mechanism for a transmission, and more particularly, to a mechanical actuating mechanism therefore.

Hydraulically operated transmissions, including forward/reverse shift units with hydraulically actuated clutches, are known. Such transmissions require a hydraulic pump, and providing power to the pump reduces the overall efficiency of the transmission. A solution to this problem is to provide a dual clutch forward/reverse shuttle shift mechanism, as described in co-pending U.S. patent application Ser. No. 09/070,357 (Atty. Docket No. 14330). For such a dual clutch mechanism, it would be desirable to provide a mechanically operated actuator mechanism. It would also be desirable to have such a mechanical actuator mechanism which provides a shifting characteristic which is similar to that provided by a conventional hydrostatic driven forward/reverse shuttle shifter. It would also be desirable to have such an actuator mechanism which enables shuttle shifting while the transmission is in any gear. It would also be desirable to have such a mechanical actuator mechanism which provides a positive neutral override function wherein both clutches are disengaged, such as when the transmission is shifted to different gear ranges.

SUMMARY OF THE INVENTION

Accordingly, an object of this invention is to provide mechanical actuator mechanism for a mechanically operated dual clutch forward/reverse shift unit.

A further object of the invention is to provide such a mechanical actuator mechanism which provides a positive neutral override function.

Another object of the invention is to provides a shifting characteristic which is similar to that provided by a conventional hydrostatic driven forward/reverse shuttle shifter.

These and other objects are achieved by the present invention, wherein an actuator mechanism for a dual clutch forward/reverse shifter unit is provided. The shifter unit includes a pair of spring engaged clutch units and a pair of lifter pins. Each pin is movable to disengage a corresponding one of the clutches. The actuator mechanism includes a shaft which has cam surfaces formed on the surface thereof. A hollow cylindrical sleeve is rotatably mounted on the shaft. The sleeve has a pair of openings through which the cam surfaces are exposed. A pair of lifter levers are pivotally mounted in the housing. Each lifter has one side engaging a corresponding one of the lifter pins, and has another side engable with one of the cam surfaces through one of the sleeve openings. The sleeve is rotatable so that the surface of the sleeve pivots the lifters to disengage both clutches and disengages the lifters from the shaft so that the shaft can be rotated to accomplish a shuttle shift. The sleeve is then returned to the position where the cam surfaces and the lifters cooperate with the lifter pins to disengage one clutch while engaging the other.

DESCRIPTION OF THE PREFERRED EMBODIMENT

Referring now to FIGS. 1–4, a dual clutch shuttle shift unit 10 includes a housing 12 which rotatably supports an input shaft 14 by bearings at each end. An input gear 16 is non-rotatably connected to a splined portion of the shaft 14. The input gear 16 is meshingly coupled to a forward clutch gear 18 and a reverse clutch gear 20. Forward clutch gear 18 is rotatably mounted on an output shaft 22 via bearing 24. Reverse clutch gear 20 is rotatably mounted on an idler shaft 26 via bearing 28. A forward bull gear 30 is non-rotatably mounted on the output shaft 22, and a reverse bull gear 32 is non-rotatably mounted on the idler shaft 26. Gears 30 and 32 are in meshing enagement with each other. Each clutch gear 18, 20 is coupled to its respective shaft 22, 26 by a respective clutch assembly 34, 36.

Each clutch assembly 34, 36 is basically similar to a conventional commercially available motorcycle clutch, with minor modifications, and is a spring engaged, manually or mechanically disengaged clutch, such as made by F.C.C. Co. Ltd., a subsidiary of Kanematsu USA, Inc. In this application, the commercially available clutch was modified to provide additional running clearance, to permit so the riveting attachment of clutch gears 18 and 20, to accommodate a splined input shaft, by the addition of a clutch lifter plate and a bearing, and by the removal of a judder spring and a judder seat (both not shown). Viewing FIG. 4, clutches 34 and 36 can be disengaged by upward movement of lifter pins 56 or 58, respectively, and clutches 34 and 36 are arranged side-by-side and are spaced laterally apart from each other.

Figure 4:
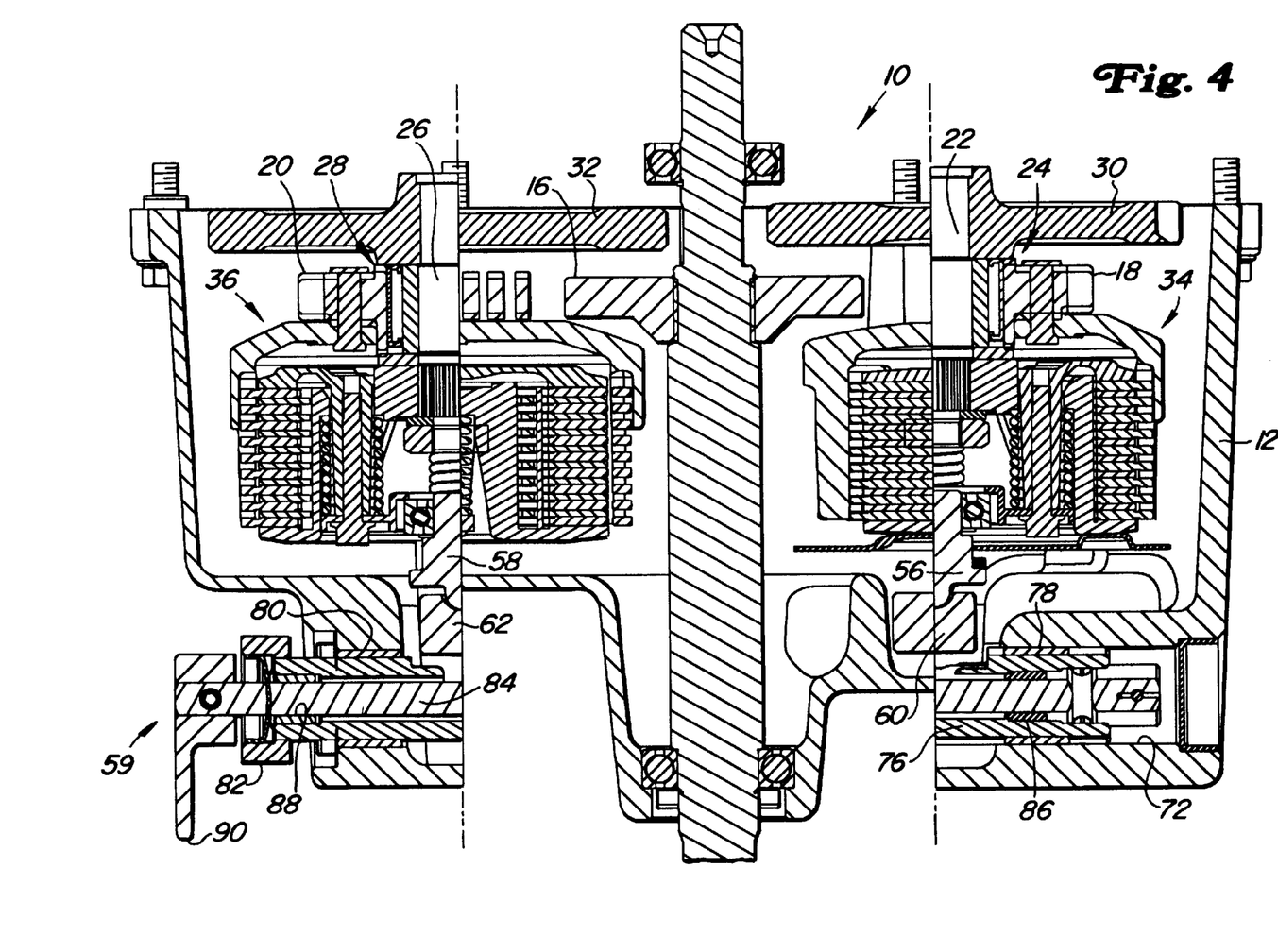
FIG. 4 is a sectional view taken along line 4—4 of FIG. 2.
Figure 6:
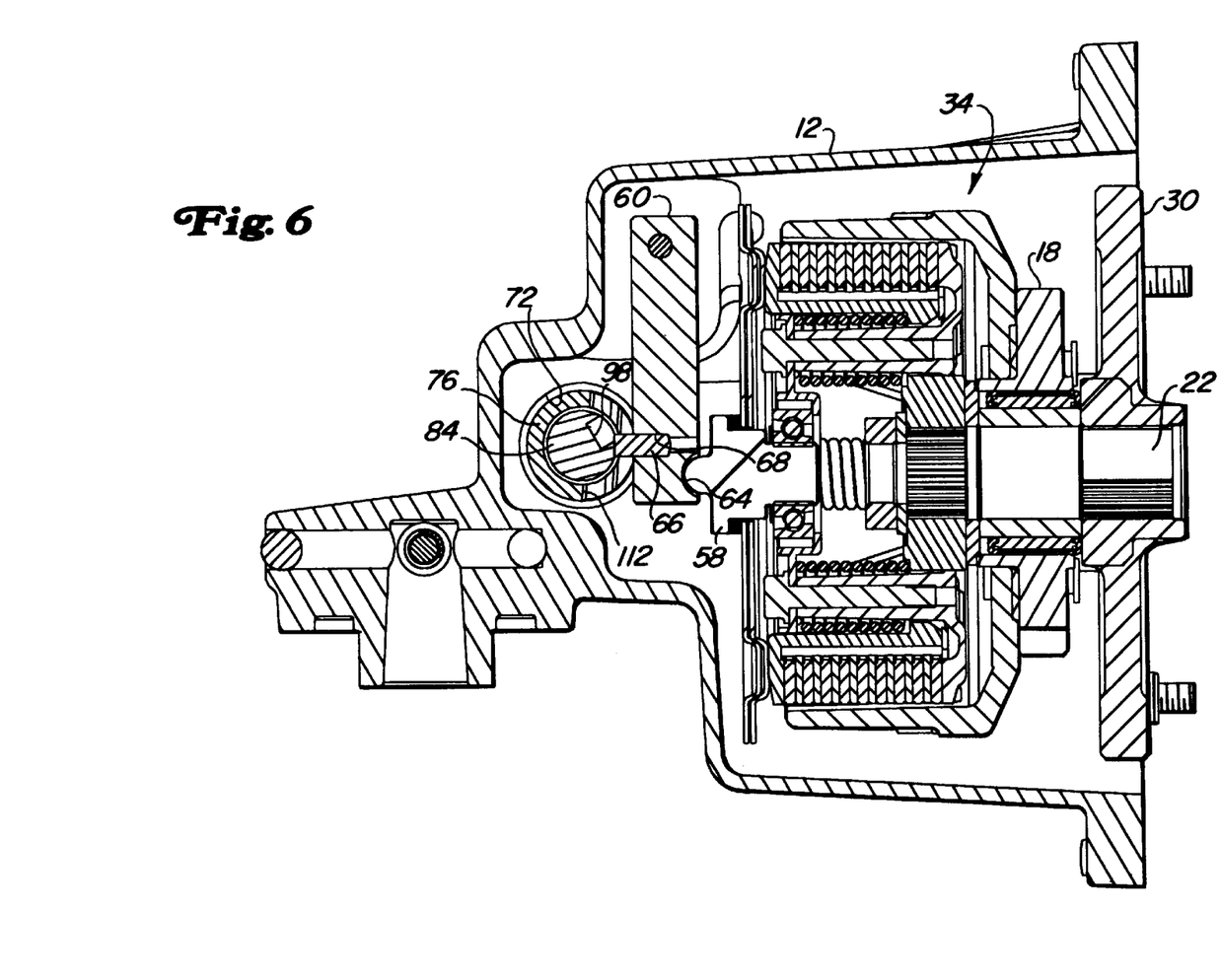
FIG. 6 is a sectional view taken along line 6—6 of FIG. 2.

The position of lifter pins 56,58 and the engagement status of clutches 34 and 36, respectively, is controlled by actuator mechanism 59, best seen in FIGS. 4 and 6. The actuator mechanism 59 includes lifters or levers 60 and 62 which are pivotally mounted in the housing 12 and which engage lifter pins 56 and 58. As best seen in FIG. 6, each lifter 60,62 has a recess 64 which receives an end on the corresponding lifter pin 56,58 and a pin 66 which is pressed into a stepped bore 68 in the body of the lifters 60,62.

Actuator mechanism 59 includes a bores 72 and 74 formed in opposite side walls of the housing 12. A hollow cylindrical sleeve (outer shuttle shaft or clutch override sleeve) 76 is rotatably supported in the bores by bearings 78 and 80. A clutch override lever 82 is attached to an outer end of sleeve 76, and is preferably coupled by a linkage (not shown) to a foot pedal (not shown). An inner shuttle shaft 84 is rotatably mounted inside sleeve 76 by bearings 86 and 88. A shuttle shift lever 90 is fixed to the outer end of shaft 84, and is preferably coupled by a linkage (not shown) to a manually operable shuttle shift operator control device (not shown), such as a hand lever located in a vehicle cab (not shown).

Figure 5:
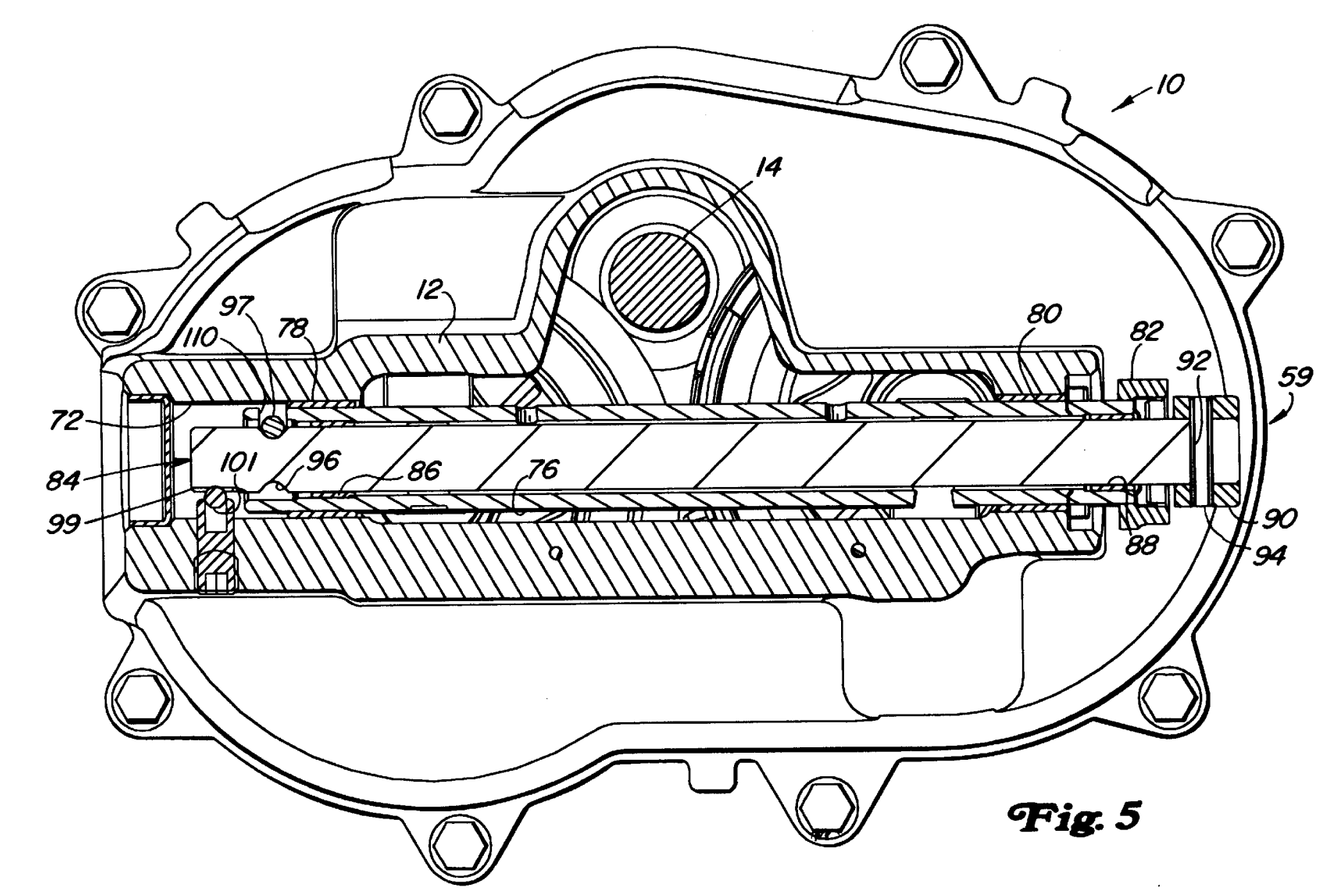
FIG. 5 is a sectional view taken along line 5—5 of FIG. 3.

Referring now to FIGS. 5 and 7–9, the inner shaft 84 has cross bore 92. A pin 94 is pressed into bore 92 to hold lever 90 in place. An annular groove 96 is formed near the other end of shaft 84. Groove 96 receives a locating pin 97 which holds the shaft 84 in place axially in the housing 12. As best seen in FIG. 5, a shallow groove 99 extends axially near an end of shaft 84. A detent ball 101 is biased into groove 99 to releasably hold the shaft 84 in the position shown in FIGS. 5 and 6. The detent ball 101 is biased by a commercially available spring plunger, such as made by Carr Lane Mfg. Co.

Figure 7:
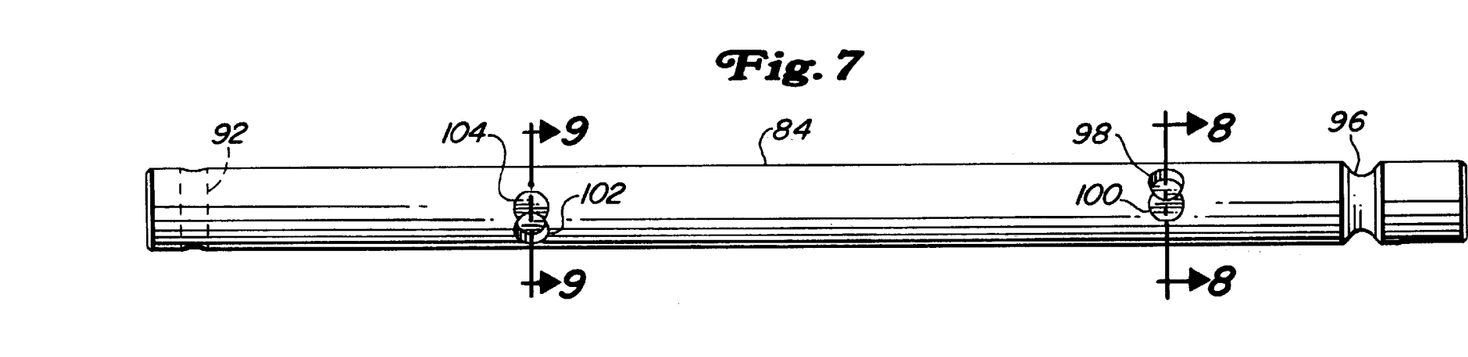
FIG. 7 is side view of the inner shuttle shaft of the present invention viewing to the left with respect to FIG. 6.
Figure 8:
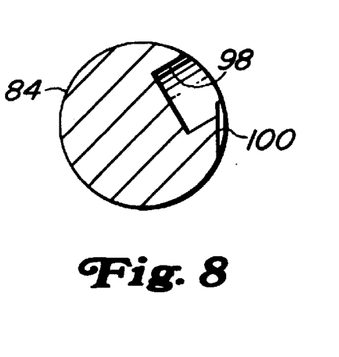
FIG. 8 is a sectional view taken along line 8—8 of FIG. 7.
Figure 9:
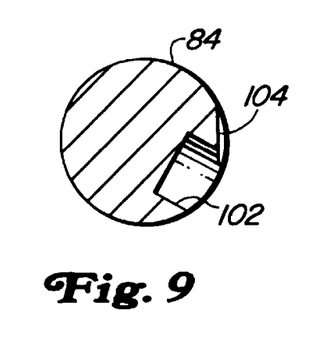
FIG. 9 is a sectional view taken along line 9—9 of FIG. 7.

As best seen in FIG. 8, a deeper blind radial bore or recess 98 extends into the surface of shaft 84 at a position so as to be engagable with pin 66 of lifter 60. A shallower blind bore or recess 100 overlaps and intersects bore 98. As best seen in FIG. 9, a deeper blind radial bore or recess 102 extends into the surface of shaft 84 at a position so as to be engagable with a pin (not shown) of lifter 62. A shallower blind bore or recess 104 overlaps and intersects bore 102. As best seen in FIGS. 7–9, the axis of bores 98 and 102 are oriented at an angle of 60 degrees with respect to each other. From the point of view of FIGS. 3 and 7–9, with the lever 90 in the illustrated position and both clutches 34,36 disengaged, the axis of bore 98 is oriented 30 degrees counterclockwise with respect to the axis of bore 100 and a longitudinal axis of lever 90. Similarly, the axis of bore 102 is oriented 30 degrees clockwise with respect to the axis of bore 104 and a longitudinal axis of lever 90. In this situation, as best seen in FIG. 6, the end pin 66 of lifter 60 will be received by shallow bore 100, and the end of the pin (not shown) of lifter 62 will be received by shallow bore 104. From FIGS. 7–9, it can be seen that the pair of cam surfaces are spaced axially apart from each other, the shallower recesses 100, 104 of both cam surfaces have axis which are contained in a plane which also contains an axis of the shaft 84, and the deeper recesses 98 and 102 are oriented so that their axis are 30 degrees above and below, respectively, this plane.

Figure 10:
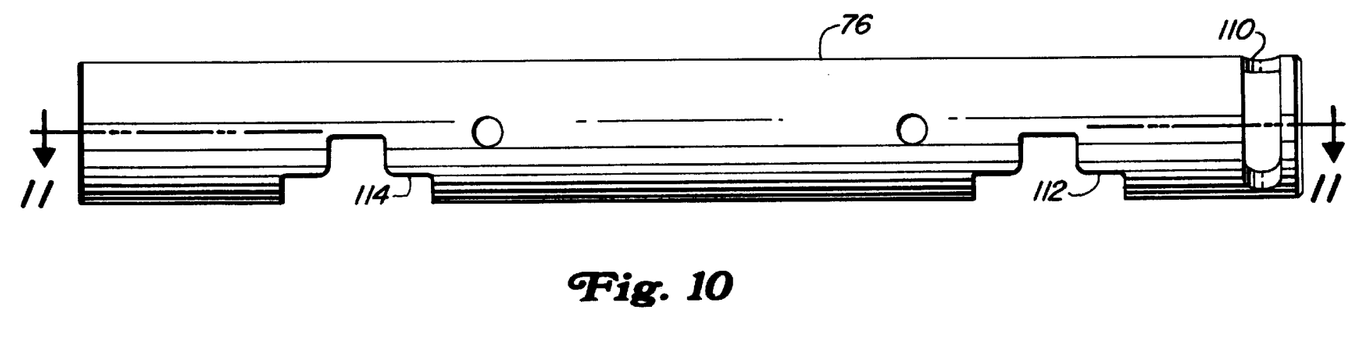
FIG. 10 is bottom view of the outer shuttle shaft or clutch override sleeve of the present invention.
Figure 11:
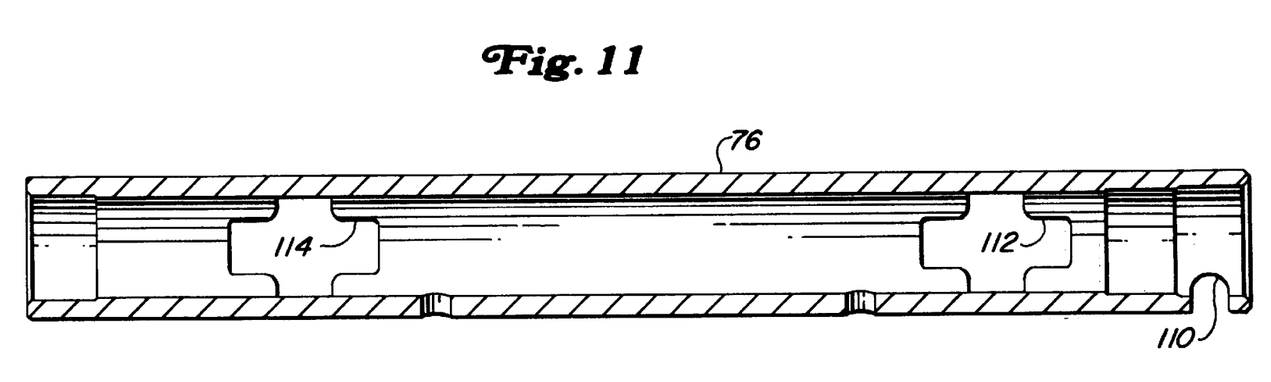
FIG. 11 is a sectional view taken along line 11—11 of FIG. 10.

Referring now to FIGS. 10 and 11, the sleeve 76 includes a slot 110 through which extends the locating pin 97 so that pin 97 also holds sleeve 76 axially in place while permitting the sleeve 76 to rotate a limited amount. A pair of cross-shaped openings 112 and 114 are formed in the wall of sleeve 76, so that the lifter pin of lifter 60 extends through opening 112 and the lifter pin of lifter 62 extends through opening 114.

Mode of Operation

With levers 90 and 82 in the illustrated positions, the pin of the lifters 60 and 62 will be received by the shallow inner shaft bores 100 and 104, respectively, and both clutches 34 and 36 will be disengaged. The spring force of the clutches 34 and 36, acting on the shaft 84 through the pins of lifters 60 and 62, is large enough to normally prevent rotation of shaft 84 and lever 90 out of this neutral position.

Figure 1:
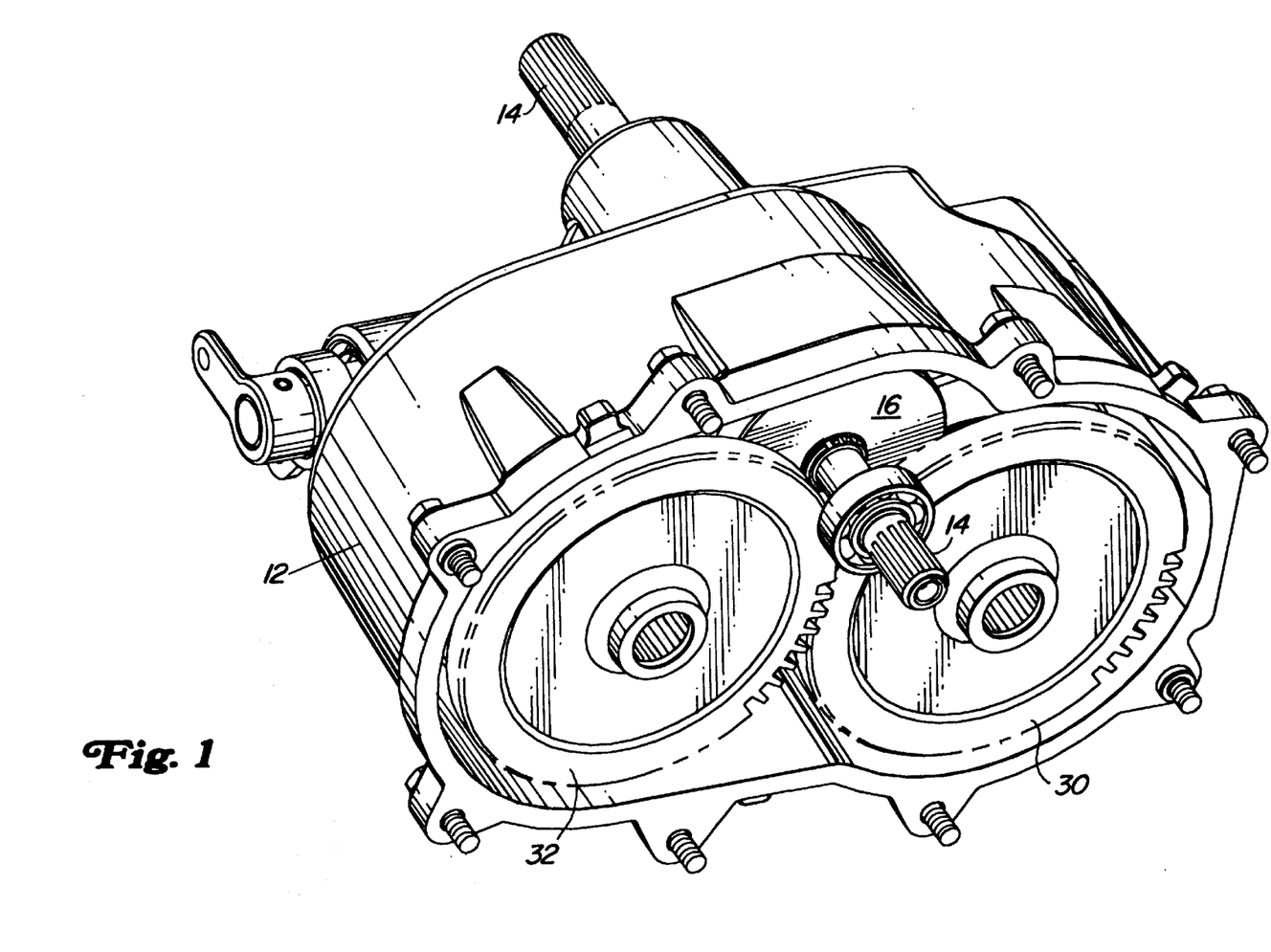
FIG. 1 is a perspective view of a dual clutch reverser unit utilizing the present invention.
Figure 2:
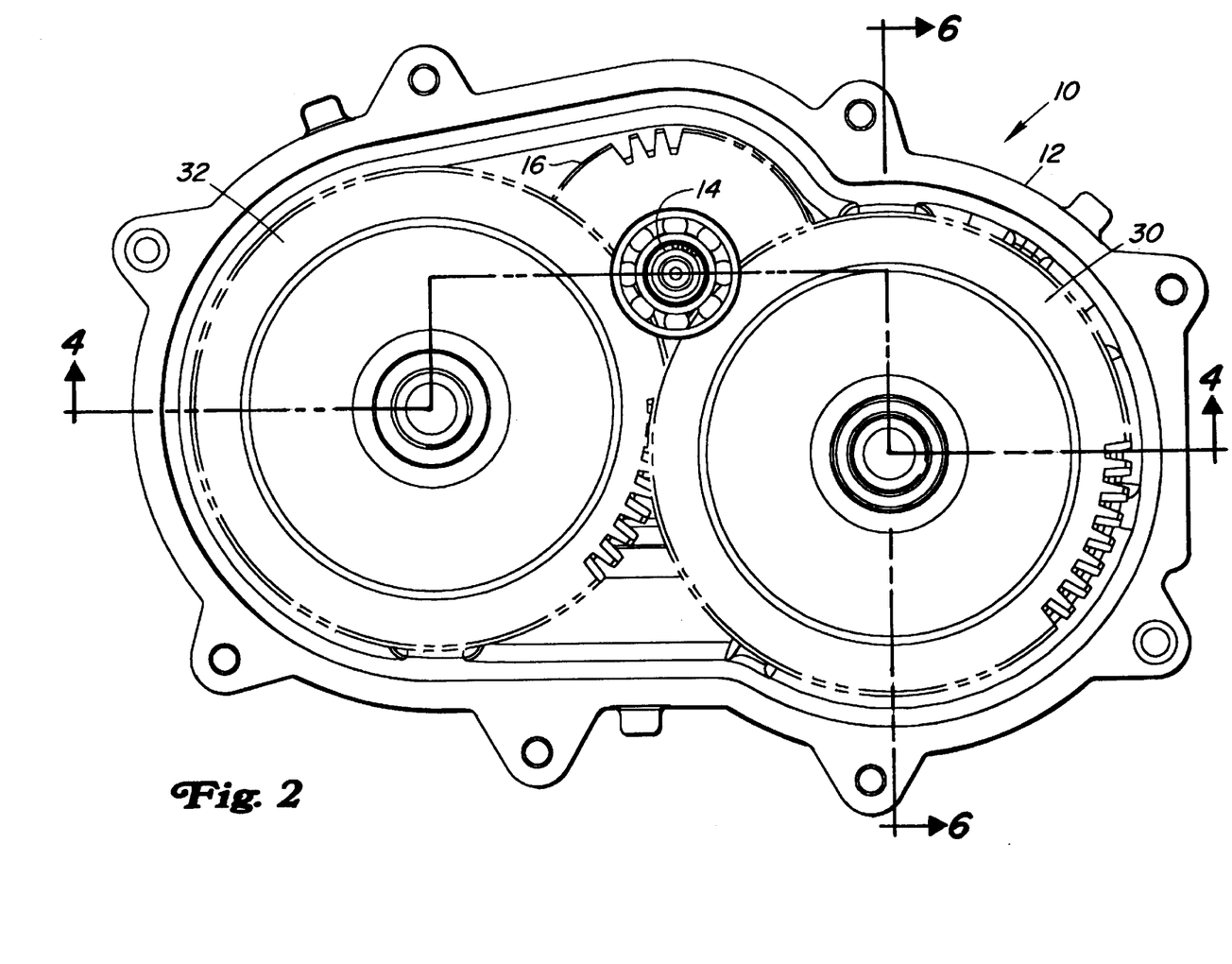
FIG. 2 is an end view of the reverser unit of FIG. 1.
Figure 3:
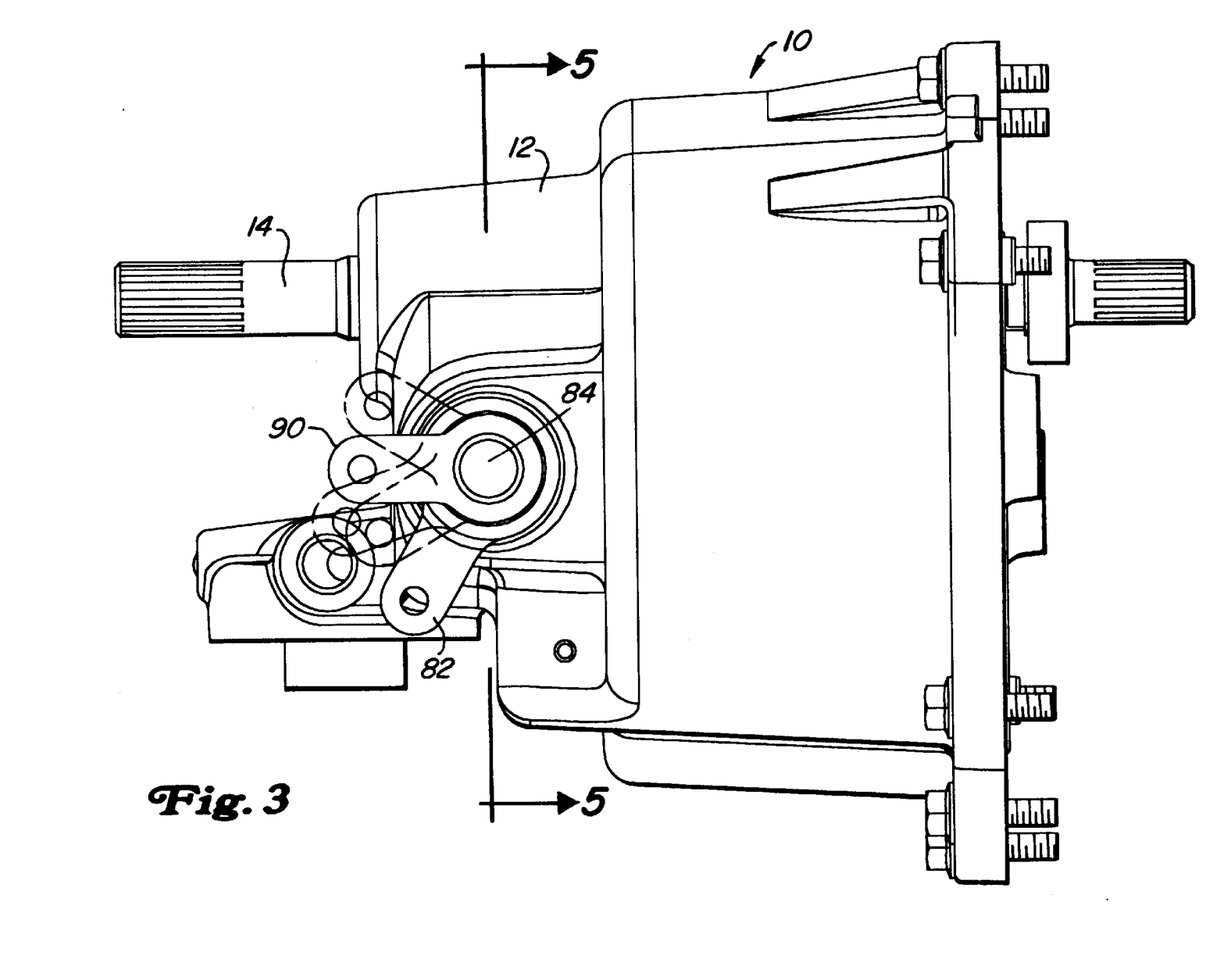
FIG. 3 is a side view of the reverser unit of FIG. 1.

To shift the mechanism 10 into forward, the operator must depress a clutch pedal (not shown) to pivot lever 82 clockwise 40 degrees, viewing FIG. 3. This rotates sleeve 76 so that a wall of the sleeve 76 surrounding openings 112 and 114 will engage the lifters 60 and 62 and pivot the lower ends of lifters 60 and 62 to the right, viewing FIG. 6. This moves the pins of the lifters 60 and 62 out of the shallow bores 100 and 104. With the lifter pins no longer applying a force to the shaft 84, the lever 90 and the shaft 84 can be rotated.

If, while the clutch pedal (not shown) is depressed, the lever 90 and shaft 84 are pivoted clockwise 30 degrees viewing FIG. 3, and then the clutch pedal is released, the pin of lifter 60 will be received by bore 98, the lower end of lifter 60 will pivot to the left viewing FIG. 6, forward clutch 34 will be engaged and output shaft 22 will counter-rotate with respect to input shaft 14. At the same time, the pin of lifter 62 will come to rest on the outside diameter of shaft 84 and reverse clutch 36 will remain disengaged. Torque can then flow from input shaft 14 to output shaft 22 via gears 16 and 18, and clutch 34, and output shaft 22 will rotate in the opposite direction as input shaft 14. Because the pin of lifter 60 is received by bore 98, the shaft 84 cannot be rotated out of this forward position until the clutch pedal (not shown) is again depressed.

To shift the mechanism 10 back into neutral, the operator must depress the clutch pedal, rotate the lever 90 and shaft 84 counter-clockwise 30 degrees back to the original neutral position described earlier.

Similarly, to shift the mechanism 10 into reverse, the operator must also depress the clutch pedal (not shown), pivot the lever 90 and shaft 84 counter-clockwise 30 degrees from the neutral position shown in FIG. 3, and then release the clutch pedal. This causes the pin of lifter 60 to rest on the outer diameter of shaft 84 and causes the pin of lifter 62 to enter deeper bore 102. This causes the lower end of lifter 62 to pivot towards shaft 84 so that reverse clutch 36 will engage. Torque can then flow from input shaft 14 to output shaft 22 via gears 16 and 20, clutch 36, and gears 32 and 30, and output shaft 22 will rotate in the same direction as input shaft 14. Because the pin of lifter 62 is received by bore 102, the shaft 84 cannot be rotated out of this forward position until the clutch pedal (not shown) is again depressed.

To shift the mechanism 10 back into neutral, the operator must depress the clutch pedal, rotate the lever 90 and shaft 84 clockwise 30 degrees back to the original neutral position described earlier.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a dual clutch forward/reverse shifter unit, the shifter unit having a pair of clutches, an actuator mechanism comprising:
    a housing;
    a shaft rotatably mounted in the housing and having a pair of cam surfaces formed on an outer periphery thereof, each cam surface being operatively coupled to a corresponding one of the clutches, the shaft being rotatable so that the cam surfaces operate to control engagement and disengagement of the clutches; and
    a hollow cylindrical sleeve rotatably mounted on the shaft and having a pair of openings formed therein, said openings exposing said cam surfaces and enabling cooperation between the cam surfaces and the clutches, the sleeve being rotatable to a position wherein a wall of the sleeve operates to disengage both clutches.

2. The actuator mechanism of claim 1, further comprising:
    a pair of lifter members pivotally supported in the housing, each lifter member having one side engaging a corresponding one of the clutches, and having another part engagable with one of the cam surfaces through one of said openings.

3. In a dual clutch forward/reverse shifter unit, the shifter unit having a pair of clutches, an actuator mechanism comprising:

a housing;

a shaft rotatably mounted in the housing and having a pair of cam surfaces formed on an outer periphery thereof, each cam surface being operatively coupled to a corresponding one of the clutches, the shaft being rotatable so that the cam surfaces operate to control engagement and disengagement of the clutches; and a pair of lifter members pivotally supported in the housing, each lifter member having one side engaging a corresponding one of the clutches, and having another part engagable with one of the cam surfaces.

4. In a dual clutch forward/reverse shifter unit, the shifter unit having a pair of clutches, an actuator mechanism comprising:

a housing; and a shaft rotatably mounted in the housing and having a pair of cam surfaces formed on an outer periphery thereof, each cam surface being operatively coupled to a corresponding one of the clutches, the shaft being rotatable so that the cam surfaces operate to control engagement and disengagement of the clutches, each cam surface comprises a deeper recess and a shallower recess formed in a surface of the shaft.

5. The actuator mechanism of claim 4, wherein:

the deeper recess and the shallower recess partially overlap each other.

6. The actuator mechanism of claim 4, wherein:

the pair of cam surfaces are spaced axially apart from each other, and the shallower recesses of both cam surfaces having axis which are contained in a plane which contains an axis of the shaft.

7. In a dual clutch forward/reverse shifter unit, the shifter unit having a pair of clutch units, an actuator mechanism comprising:

a housing;

a shaft rotatably mounted in the housing; and a hollow cylindrical sleeve rotatably mounted on the shaft, the shaft and the sleeve being operatively coupled to the clutch units, the shaft being rotatable to selectively engage one or the other of said clutch units, the sleeve being rotatable to a neutral position wherein both clutches are disengaged.

8. The actuator mechanism of claim 7, wherein:

the shaft has a pair of cam surfaces formed on an outer periphery thereof each cam surface being operatively coupled to a corresponding one of the clutch units, the shaft being rotatable so that the cam surfaces operate to control engagement and disengagement of the clutch units.

9. The actuator mechanism of claim 8, wherein:

the sleeve has a pair of openings formed therein, said openings exposing said cam surfaces and enabling cooperation between the cam surfaces and the clutch units, the sleeve being rotatable to a position wherein a wall of the sleeve operates to disengage both clutch units.

10. The actuator mechanism of claim 9, further comprising:

a pair of lifter members pivotally supported in the housing, each lifter member having one side engaging a corresponding one of the clutches, and having another part engagable with one of the cam surfaces through a corresponding one of said openings.

11. The actuator mechanism of claim 8, further comprising:

a pair of lifter members pivotally supported in the housing, each lifter member having one side engaging a corresponding one of the clutch units, and having another part engagable with one of the cam surfaces.

12. The actuator mechanism of claim 8, wherein:

each cam surface comprises a deeper recess and a shallower recess formed in a surface of the shaft.

13. The actuator mechanism of claim 12, wherein:

the deeper recess and the shallower recess partially overlap each other.

14. The actuator mechanism of claim 12, wherein:

the pair of cam surfaces are spaced axially apart from each other, and the shallower recesses of both cam surfaces having axis which are contained in a plane which contains an axis of the shaft.

* * * * *